(12) United States Patent
Daidone et al.

(10) Patent No.: US 11,509,544 B2
(45) Date of Patent: Nov. 22, 2022

(54) DETERMINING A SERVICE LEVEL IN A COMMUNICATION NETWORK

(71) Applicant: Telefonaktiebolaget LM Ericsson (publ), Stockholm (SE)

(72) Inventors: Roberta Daidone, Pisa (IT); Paola Iovanna, Pisa (IT); Roberto Magri, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 734 days.

(21) Appl. No.: 16/317,861

(22) PCT Filed: Jul. 15, 2016

(86) PCT No.: PCT/EP2016/066974
§ 371 (c)(1),
(2) Date: Jan. 15, 2019

(87) PCT Pub. No.: WO2018/010824
PCT Pub. Date: Jan. 18, 2018

(65) Prior Publication Data
US 2021/0288888 A1    Sep. 16, 2021

(51) Int. Cl.
*G06F 15/16* (2006.01)
*H04L 41/5009* (2022.01)
(Continued)

(52) U.S. Cl.
CPC ........ *H04L 41/5009* (2013.01); *G06F 16/345* (2019.01); *H04L 41/5032* (2013.01);
(Continued)

(58) Field of Classification Search
CPC . H04L 41/5009; H04L 41/5058; H04L 43/06; H04L 41/5032; H04L 43/04; H04L 41/5035; H04L 43/08; G06F 16/345
See application file for complete search history.

(56) References Cited

U.S. PATENT DOCUMENTS 6,925,493 B1 *  8/2005  Barkan ............... G06F 11/3495
                                                        709/224
7,937,470 B2 *  5/2011  Curley ............... H04L 43/0864
                                                        709/224
(Continued)

FOREIGN PATENT DOCUMENTS

CN        1859227 A     11/2006
CN      101512971 A      8/2009
(Continued)

OTHER PUBLICATIONS

Chinese Office Action issued for Application No. 201680089329.7—dated Jun. 28, 2021.
(Continued)

*Primary Examiner* — Ario Etienne
*Assistant Examiner* — Thorne E Waugh
(74) *Attorney, Agent, or Firm* — Christopher & Weisberg, P.A.

(57) ABSTRACT

A method of determining an end-to-end, E2E, service level for a communications network (100) by a network management entity (101). The communications network (100) comprises one or more network domain. The method comprises obtaining (201) a first set of service level data for the one or more network domain. The first set of service level data for said one or more network domain comprises a summarized set of data derived from service level data monitored by said one or more network domain. The method further comprises determining (202) the end-to-end service level based on the obtained first set of service level data from the one or more network domain.

13 Claims, 10 Drawing Sheets

(51) Int. Cl.
  *G06F 16/34* (2019.01)
  *H04L 41/50* (2022.01)
  *H04L 43/04* (2022.01)
  *H04L 43/06* (2022.01)
  *H04L 43/08* (2022.01)
  *H04L 43/091* (2022.01)

(52) U.S. Cl.
  CPC .......... *H04L 41/5058* (2013.01); *H04L 43/04* (2013.01); *H04L 43/06* (2013.01); *H04L 43/08* (2013.01); *H04L 43/091* (2022.05)

(56) References Cited

U.S. PATENT DOCUMENTS

| | | | | |
|---|---|---|---|---|
| 8,060,017 | B2 * | 11/2011 | Schlicht | H04L 1/0015 455/41.2 |
| 8,200,814 | B2 * | 6/2012 | Musman | G06F 11/3495 709/224 |
| 8,667,575 | B2 * | 3/2014 | Thakur | G06F 21/41 726/4 |
| 9,596,299 | B2 * | 3/2017 | Yengalasetti | H04L 61/4511 |
| 10,984,128 | B1 * | 4/2021 | Hoffer | G16B 50/00 |
| 2003/0225549 | A1 * | 12/2003 | Shay | H04L 43/50 702/182 |
| 2006/0277307 | A1 * | 12/2006 | Bernardin | H04L 67/562 709/226 |
| 2009/0077210 | A1 * | 3/2009 | Musman | G06Q 10/10 709/223 |
| 2009/0279444 | A1 | 11/2009 | Ravindran et al. | |
| 2012/0014289 | A1 * | 1/2012 | Ortega | H04W 52/04 370/255 |
| 2016/0182344 | A1 | 6/2016 | Subhedar et al. | |
| 2016/0234730 | A1 * | 8/2016 | John | H04W 36/0033 |
| 2016/0353268 | A1 * | 12/2016 | Senarath | H04L 47/805 |
| 2018/0242161 | A1 * | 8/2018 | Vulgarakis Feljan | H04W 24/02 |

FOREIGN PATENT DOCUMENTS

| | | |
|---|---|---|
| CN | 102055663 A | 5/2011 |
| CN | 102595472 A | 7/2012 |
| CN | 103250445 A | 8/2013 |
| CN | 103493433 A | 1/2014 |
| CN | 104486032 A | 4/2015 |
| WO | 03 084134 A1 | 10/2003 |
| WO | 2015 139732 A1 | 9/2015 |

OTHER PUBLICATIONS

Requirements for Abstraction and Control of TE Networks by Lee et al.; Internet-Draft; ACTN Requirement; Expires Oct. 1, 2016- Apr. 2015.
International Search Report for International application No. PCT/EP2016066974—dated Feb. 6, 2017.
Sflow Products Index (http://www.sflow.org/products/index.php)—Copyright 2003-2016.
The Management Paradigm Shift: Challenges From Element Management to Service Management by Servin Erfani et al.; Lucent Technologies Inc., Bell Labs Technical Journal; Copyright 2000—Oct.-Dec. 2000.

* cited by examiner

DETERMINING A SERVICE LEVEL IN A COMMUNICATION NETWORK

PRIORITY

This nonprovisional application is a U.S. National Stage Filing under 35 § 371 of International Patent Application Serial No. PCT/EP2016/066974 filed Jul. 15, 2016 and entitled "Determining A Service Level In A Communication Network" which is hereby incorporated by reference in its entirety.

TECHNICAL FIELD

The disclosure relates to a method of determining a service level in a communication network, and a network control entity configured to determine a service level in a communication network.

BACKGROUND

Future mobile networks will need to satisfy a wide range of challenging requirements such as very high bandwidth, cheap and wide coverage, low delays etc.) One homogeneous network will not be able to satisfy these requirements. The IETF defines a framework standardizing an interface between SDN controllers and the physical communications network entities; this is called the Abstraction and Control of Transport Networks, ACTN, framework, for example as described in IETF Internet-draft for ACTN framework: Ceccarelli et al, "draft-ceccarelli-teas-actn-framework-02.txt", 14 Apr. 2016.

FIG. 1 depicts the primary network elements of an example network 10, in some examples according to the ACTN framework. The network 10 comprises a plurality of domains 20, the network 10 configured to carry data across one or more of the domains. The separate domains 20 interface to a network management control entity 40, for example termed a Multi-Domain Service Coordinator (MDSC). Each domain interfaces the MDSC via a domain control entity, for example termed a Physical Network Controller, PNC 30. The definition of a 'domain' within the IETF ACTN is everything that is under the control of the same controller, where the controller is the PNC. Thus, a PNC represents the abstraction of its domain. A domain may comprise a single physical technology or multiple technologies. Domains can also be subdivided into multiple sub-domains such as administrative domains, routing domains and can be composed of different layers.

The PNC 30 provides an interface to the MDSC to enable the MDSC to coordinate the various domains through which a certain service can be offered.

Another concept being applied to future networks to manage the challenge of diverse service offering via a multi-domain network is the concept of network slicing. Network slicing has been introduced in the development of Fifth Generation networks, 5G.

Network slicing provides a further level of abstraction to the logical entities and functions provided by the network. In some aspects, a network slice comprises the chaining of network functions needed to provide the services required for the network slice. Examples of use cases for network slicing are Mobile Broadband service or Mission Critical Machine Type Communication.

In networks currently deployed, the Service Level is the performance of the network with respect to certain characteristics or Quality of Service (QoS) metrics. Service level is verified against a Service Level Agreement (SLA), which can be made between the network infrastructure provider/manufacturer and the network operator. Such SLA verification is typically realized only as a single network. In heterogeneous networks (i.e. multi-domain networks), the service level parameters or metrics may be monitored, but there are no holistic approaches to provide an end-to-end solution for SLA verification.

SUMMARY

A first aspect of the disclosure provides a method of determining an end-to-end, E2E, service level for a communications network by a network management entity, wherein the communications network comprises one or more network domain. The method comprising obtaining a first set of service level data for the one or more network domain. The first set of service level data for said one or more network domain comprises a summarized set of data derived from service level data monitored by said one or more network domain. The method further comprises determining the end-to-end service level based on the obtained first set of service level data for the one or more network domain.

This provides for the managing node to determine E2E service level based on domain service level data. This provides a level of granularity to assist analysing where in the network certain service level degradations might be occurring. Additionally, because the decision is based on a summarized set of data, the E2E service level can be analysed in an efficient manner and with a reduced signalling overhead.

In some examples, a format of the first set of service level data is independent of a technology of the network domain or is in a common format for a plurality of said network domains. This allows a simplified aggregation of the service level data to determine the E2E service level.

In some examples, the communications network is divided into a plurality of network slices, wherein a network slice provides network capabilities for an end-to-end service and the service level data for the one or more network domain comprises service level data for the one or more network domain associated with one of said plurality of network slices. This further delimits the domain level granularity to a specific service set or feature set.

In some examples, the method comprises comparing the determined E2E service level with an E2E service level performance criteria, and obtaining a second set of service level data for the one or more network domain when the determined E2E service level is not satisfying the E2E service level performance criteria. The second set of service level data comprises additional information to the first set of service level data.

Thus the network receives a high level (aggregate) set of metrics which enables an efficient first assessment of the E2E service level with reduced signalling load but if degradation is detected a second more detailed set or the possibly the entire set of domain service level data monitored is obtained to enable a more thorough analysis to be performed even if the end-to-end service level meets the required performance.

In some examples, the method further comprises determining that one or more network domain is not satisfying one or more performance criteria for the one or more network domain, and selecting a second network domain for which the first or a/said second set of service level data are over-performing with respect to the one or more performance criteria for the second network domain. The method further comprises requesting said second network domain to maintain or increase one or more performance criteria for said second network domain to compensate for said first network domain.

Thereby, the managing node can mitigate the effect of underperforming domains on the E2E service level by maintaining or increasing the performance criteria for overperforming domains.

In some examples, the first set of service level data of one or more network domain is received at a predefined time interval, for example at the expiry of a timer. Thus the managing node does not need to send explicit requests for service level data reporting.

In some examples, obtaining the first set of service level data or a/said second set of service level data comprises requesting the first set of service level data or second set of service level data and receiving, in response, the requested set of service level data for the one or more network domain.

In this example the domain controller does not need to implement timers for service level data reporting which can reduce the processor load for the domain.

In some examples, a subset of the service level data monitored by the domain is requested.

In other examples, the detailed service level data is requested, wherein the detailed service level data comprises all of the data monitored by the domain.

In some examples, the method further comprises deriving E2E network service level constraints from a E2E Service Level Agreement (SLA). and signalling said constraints for the one or more network domains.

In some examples, the method further comprises translating a E2E network service level constraint into a network domain service level constraint for the one or more network domain; and signalling said network domain service level constraint for the one or more network domain.

Thus the domain nodes receive domain specific constraints with which they should comply to allow the network to satisfy E2E service level.

In some examples, the one or more network domains are one of a packet based network, an optical network or WDM network.

In some examples, the method is performed by a Multi Domain Service Coordinator (MDSC) wherein the MDSC forms part of an Abstraction and Control of Transport Networks, ACTN, framework.

A second aspect of the disclosure provides a method of monitoring a local service level in a domain control entity configured to control a network domain in a communications network. The method comprising monitoring service level data for the network domain and summarizing the monitored data into a first set of service level data. The method comprises reporting the first set of service level data to a network management entity for determining an E2E service level for the communications network.

Thus the E2E service level is based on domain service level data which provides a level of granularity to assist analyzing where in the network certain service level degradations might be occurring. Additionally, since the determination is based on a summarized or compressed set of data, the E2E service level can be analyzed in an efficient manner.

In some examples, the summarizing the monitored data into a first set of service level data comprises one or more of: an average over time, an aggregate of a plurality of data flows, a subset of monitored data.

In some examples, the method further comprises monitoring the service level data for traffic flows within the network domain associated with a network slice and reporting summarized service level data per network slice.

In some examples, the first set of service level data is reported at a predefined time interval, for instance, at expiry of a timer.

In some examples, the method further comprises receiving a request for additional information to the first set of service level data and reporting a second set of service level data comprising additional information to the first set of service level data.

In some examples, the method further comprises summarizing the monitored data into a first set of service level data comprises translating the monitored data into a common format.

In some examples, method further comprises determining a violation of a service level performance criteria and reporting the service level data pertaining to the violated service level performance criteria.

In some examples, the method further comprises receiving a request to report a second set of service level data, wherein the second set of service level data contains more information than the first set of service level data. The method further comprises returning the second set of service level data through one of a response to the request, a reporting procedure.

In some examples, the provision of the first set or second set of service level data is via a reference to a repository. Thus the actual data is not signalled but higher layers are enabled to retrieve the required sets of data, for example from a cloud server.

In some examples, the method further comprises receiving service level constraints for determining service level performance; and monitoring the service level for the domain according to the service level constraints.

In some examples, the service level constraints comprise constraints for the E2E service level, the method further comprising: translating the received E2E service level constraints into constraints applicable to the domain; and monitoring the service level for the domain according to the translated service level constraints applicable to the domain.

In some examples, the method further comprises translating the received service level constraints into scope for the domain.

In some examples the method is performed by a Physical Network Controller, PNC, wherein the PNC forms part of an Abstraction and Control of Transport Networks, ACTN, framework.

A further aspect of the disclosure provides a network management entity for determining an end-to-end service level in a communication network comprising one or more network domain. The network management entity is configured to obtain a first set of service level data for the one or more network domain, wherein the first set of service level data of said one or more network domain comprises a summarized set of data derived from service level data monitored by said one or more network domain. The network management entity is further configured to determine an end-to-end service level based on the obtained first set of service level data for the one or more network domain.

In some aspects, the network management entity is further configured to compare the determined E2E service level with an E2E service level performance criteria. The network management entity is configured to obtain a second set of service level data for the one or more network domain when the determined E2E service level is not satisfying the E2E service level performance criteria. The second set of service level data comprises additional information to the first set of service level data.

In some aspects, the network management entity is further configured to compare the one or more first set of service level data with one or more performance criteria for the one or more network domain. The network management entity is configured to obtain a second set of service level data for the one or more network domain when the one or more first set of service level data is not satisfying the performance criteria for the one or more network domain. The second set of service level data comprises additional information to the first set of service level data.

In some aspects, the network management entity is further configured to determine that one or more network domain is not satisfying one or more performance criteria for the one or more network domain. The network management entity is further configured to select a second network domain for which the first or second set of service level data are over-performing with respect to the one or more performance criteria for the second network domain. The network management entity is further configured to request said second network domain to maintain or increase one or more performance criteria for said second network domain to compensate for said first network domain.

In some examples, the network management entity is configured to receive the first set of service level data of one or more network domain at a predefined time interval.

In other examples, the network management entity is configured to request the first set and/or the second set of service level data.

In some examples, the network management entity is configured to receive the first set and/or the second set of service level data, in response, the requested service level data of the one or more network domain.

In some examples, the network management entity is configured to request a subset of the service level data monitored by the domain.

In some examples, the network management entity is configured to request the detailed service level data, wherein the detailed service level data comprises all of the data monitored by the domain.

In some examples, the network management entity is configured to derive E2E network service level constraints from a E2E Service Level Agreement. The network control entity is further configured to transmit said constraints for the one or more network domains.

In some examples, the network management entity is further configured to translate said E2E network service level constraints into network domain service level constraints for one or more network domain and transmit said network domain service level constraints for the one or more network domain.

In some examples, the network control entity is a Multi Domain Service Coordinator as part of an Abstraction and Control of Transport Networks, ACTN, framework.

A further aspect provides a network domain control entity configured to monitor service level data in a network domain. The network domain control entity is configured to monitor service level data for the network domain; summarize the monitored data into a first set of service level data; and report the first set of service level data to a network management entity for determining an E2E service level for the communications network.

In some aspects, a format of the first set of service level data is independent of a technology of the network domain.

In some aspects, the network domain control entity is further configured to report a second set of service level data, wherein the second set of service level data comprises additional information to the first set of service level data.

In some aspects, the network domain control entity is further configured to translate the monitored data into a common format of the first set of service level data.

In some examples, the network domain control entity is configured to monitor service level data for traffic flows within the network domain associated with a network slice.

In some examples, the network domain control entity is further configured to report the first set of service level data at a predefined time interval. In other examples, the network domain control entity is configured to receive a request for service level data pertaining to the resources under the control of the domain and provide the set of service level data to higher layers.

In some examples, the network domain control entity is configured to provide the first set and/or the second set of service level data by reference to its stored location, for example to a repository or cloud server. In some examples, the network domain control entity is a Physical Network Controller, PNC, wherein the PNC forms part of an Abstraction and Control of Transport Networks, ACTN, framework.

Aspects of the disclosure provide an apparatus for determining E2E service level in a communications network comprising one or more network domain. The apparatus comprises a processor and a memory, said memory containing instructions executable by said processor whereby said apparatus is operative to: obtain a first set of service level data for the one or more network domain, wherein the first set of service level data for said one or more network domain comprises a summarized set of data derived from service level data monitored by said one or more network domain; and determine the end-to-end service level based on the obtained first set of service level data from the one or more network domain.

Aspects of the disclosure provide an apparatus for monitoring a local service level in a communications network comprising one or more network domain. The apparatus comprises a processor and a memory, said memory containing instructions executable by said processor whereby said apparatus is operative to monitor service level data for the network domain; summarize the monitored data into a first set of service level data; and report the first set of service level data to a network management entity for determining an E2E service level for the communications network.

In some aspects, the apparatus is operative to perform any example.

Aspects of the disclosure provide an apparatus for determining E2E service level in a communications network. The apparatus comprises a service level computation module configured to obtain, via an interface module, a first set of service level data of the one or more network domain, wherein the first set of service level data of said one or more network domain comprises a summarized set of data derived from service level data monitored by said one or more network domain. The service level computation module is further configured to determine an end-to-end, E2E, service level based on the obtained first set of service level data from the one or more network domain.

In some aspects, the apparatus further comprises a service level fault diagnosis module configured to compare the determined E2E service level with an E2E service level performance criteria; and compare the one or more first set of service level data with performance criteria for the one or more network domain. The service level fault diagnosis module is configured to obtain, via the interface module, a second set of service level data of the one or more network domain when the determined E2E service level is not satisfying the E2E performance criteria or when the one or more first set of service level data is not satisfying the performance criteria for the one or more network domain, wherein the second set of service level data comprises additional information to the first set of service level data.

A further aspect of the disclosure provides an apparatus configured to monitor a local service level in a domain control entity configured to control a network domain in a communications network. The apparatus comprises a monitoring module configured to monitor a service level data for the network domain; a summarizing module configured to summarize the monitored data into a first set of service level data. The apparatus is configured to report, via an interface module, the first set of service level data to a network management entity for determining an E2E service level for the communications network.

An aspect provides a computer program for determining an end-to-end, E2E, service level for a communications network comprising one or more network domain, the computer program comprising computer code which, when run on processing circuitry of a network management entity, causes the network management entity to: obtain a first set of service level data for the one or more network domain, wherein the first set of service level data for said one or more network domain comprises a summarized set of data derived from service level data monitored by said one or more network domain; and determine the end-to-end service level based on the obtained first set of service level data for the one or more network domain.

An aspect provides a computer program for monitoring a local service level, the computer program comprising computer code which, when run on processing circuitry (310) of a domain control entity configured to control a network domain in a communications network, causes the domain control entity to: monitor service level data for the network domain; summarize the monitored data into a first set of service level data; and report the first set of service level data to a network management entity for determining an E2E service level for the communications network.

A further aspect of the disclosure provides a carrier containing a computer program comprising instructions which, when executed on at least one processor, cause the at least one processor to carry out the method according to any example.

BRIEF DESCRIPTION OF THE DRAWINGS

Embodiments of the disclosure will now be described, by way of example only, with reference to the accompanying drawings, in which.

DETAILED DESCRIPTION

A hierarchical E2E service level monitoring architecture for a multi-domain network is described. In some aspects, the network is sliced logically into different functions or services with a specific Quality of Service (QoS) requirement. In some aspects, this increases demand for service levels to be measured at various levels of network abstraction. Additionally, the monitoring provides for adapting the service level dynamically and pre-emptively.

In such a network environment, the transport infrastructure may be decoupled from service infrastructure, from a control point of view. Also, the transport infrastructure may involve heterogeneous domains, and possibly different technologies and may be provided by a plurality of manufacturers.

Figure 1:
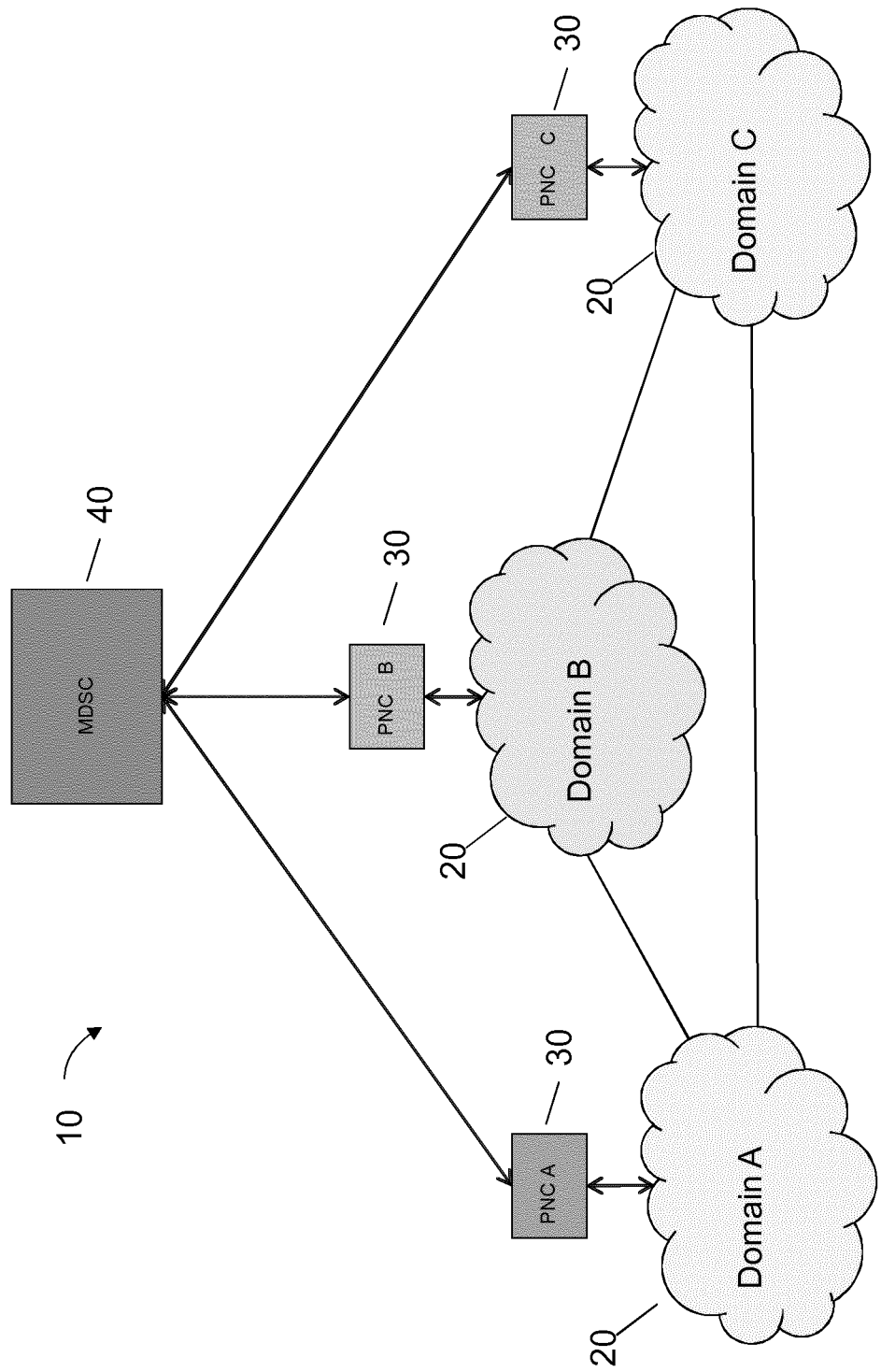
FIG. 1 shows an overview of an exemplary communication network.

Examples of the disclosure may be implemented on a network structure as shown in FIG. 1. In particular, the network may be controlled by a hierarchy of controllers. One or more network domain control entity, e.g. PNC 30, may be controlled by a network management entity, e.g. MDSC 40. In some examples, PNC 30 and MDSC 40 may be considered as Software Defined Networking (SDN) controllers. Examples of resources controlled by a domain can include packet switched transport, optical transport and radio access. Such domains may be entirely homogeneous with regards to the technology involved, for example they may employ only IEEE 802.11 (Wi-Fi) radio accesses or Wavelength Division Multiplexing. In other embodiments domains may involve multiple technologies such as a 3GPP multi-Radio Access Type (RAT) radio access network employing Long Term Evolution (LTE) and Universal Mobile Telecommunications System (UMTS) radio base stations.

Figure 2:
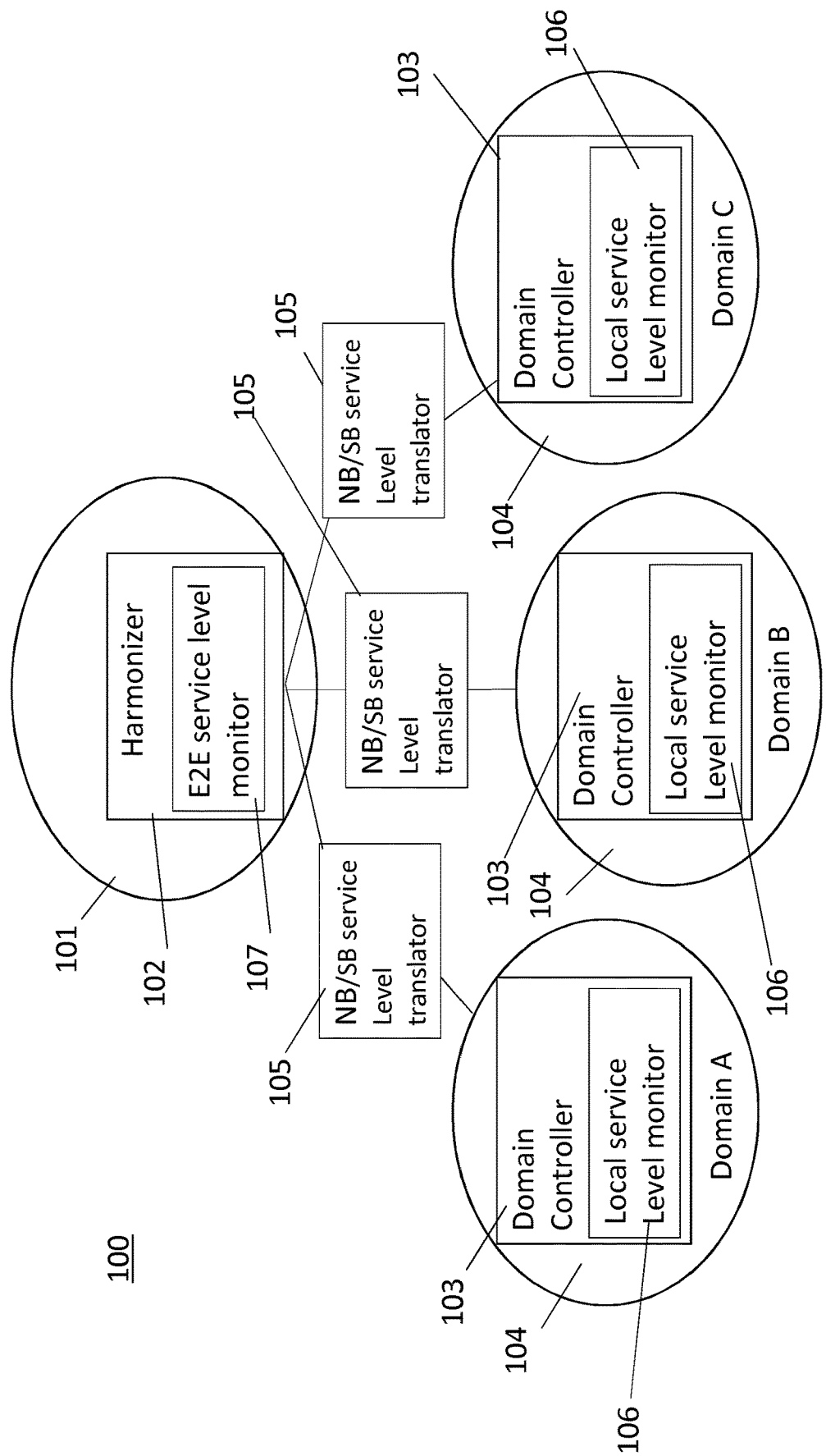
FIG. 2 shows an overview of a communication network according to an embodiment of the disclosure.

The embodiments disclosed herein provide methods and apparatus to monitor service level performance in a communications network, for example, such as the network depicted in FIG. 1. Referring to FIG. 2, a communications network 100 comprises a plurality of domains 104. Each domain comprises a domain controller 103 which controls the resources associated to the domain. The domain controller 103 may be considered as a PNC. In some examples, performance of resources (e.g. networking equipment, not shown) under the domain is measured for one or more performance criteria or metric. The measured performance may be described as the service level. Within a domain, this performance measurement can be referred to as the local service level. The domain controller 103 is configured to collect service level data compiled from service level performance criteria or metrics.

In some embodiments, the domain controller 103 may be considered as comprising a local service level monitor 106. The local service level monitor 106 is configured to perform network domain service level monitoring, i.e. service level (quality of service) monitoring for the domain (i.e. at a domain level).

The communications network 100 additionally comprises a network management entity such as a network controller 101. The network controller 101 may be considered as a higher layer controller, e.g. higher than the domain control entity. In some embodiments a logical function called a Harmonizer 102 may be implemented within the network controller. In some aspects, the Harmonizer may comprise an E2E service level monitor 107 which is configured to determine the E2E service level of the network or a slice of the network. In some examples, the E2E service level is based on receiving a first set of service level data from each domain controller 103 involved in an E2E path carrying data.

The domain controller, e.g. using the local service level monitor 106, is configured to monitor one or more performance criteria or metrics for the domain. The data collected by the local service level monitor may be considered as a full or detailed set of data for the monitored criteria or metrics. This detailed set of data may be stored by the local service level monitor, e.g. in the domain controller or in a storage accessible by the domain controller.

In some examples, the domain controller 103 is configured to perform a summarization function on the collected detailed set of data. In some examples this function could be performed by a separate entity, e.g. a plug-in.

The summarization may alternatively be considered as an aggregation or abstraction operation on the collected detailed set of data. Alternatively, the summarization may be considered as a compression or simplification from the service level data monitored by the local service level monitor 106. The set of monitored data which is summarized (or aggregated, abstracted, compressed, simplified) may be referred to as a summarized (or aggregated, abstracted, compressed, simplified) set of data or service level data. In further examples, references to summarized data may be replaced by any of the alternative terms described.

In some examples, the summarized set of service level data may be a summary or a subset of the service level data monitored. In some embodiments the summarized service level data comprises averaged values of certain metrics over time. In another embodiment the summarized service level data may comprise aggregated values of metrics for a plurality of data flows through the domain. In further examples, the summarized service level data may comprise only a subset (i.e. less than all) of the metrics or criteria monitored by the local service level monitor. The summarization provides a reduced size of the set of data which specifies the service level in the domain. Examples of the disclosure provide for any type or method of reduction.

The domain controller 103 transmits the summarized set of service level data to the E2E service level monitor 107. The E2E service level monitor 107 is configured to receive a summarized set of service level data from each domain involved in an E2E path or service. The E2E service level monitor 107 is configured to aggregate or combine the summarized service levels from each domain involved in the E2E path or service. The E2E service level monitor 107 is configured to generate an E2E service level based on the combination of the summarized service levels from each involved domain.

This provides for the E2E service level monitoring to be achieved efficiently by receiving a relatively small amount of summarized service level data. In particular, the full data set collected by the domain controller 103 is not transmitted to the E2E service level monitor 107 for E2E service level monitoring. The summarized service level data provides sufficient information to assess the E2E service level. By providing the data per domain and/or per network slice the Harmonizer is also able to efficiently monitor the service level for different parts of the network.

This approach provides for the E2E service level monitor to not have to deal with extensive sets of data when performing the initial E2E service level assessment. Additionally, this has the advantage of having a relatively small (i.e. reduced) amount of data signalled between the domain controllers and the Harmonizer, saving signalling resources and network load.

In some embodiments, the summarized set of service level data may be referred to as a first set of service level data. In some examples, the summarized set of data is provided in a standardised form, for example via a managed object definition.

In some embodiments, the detailed service level data monitored by the local service level monitor 106 is stored so that more detailed analysis by the Harmonizer 102 may be performed if required.

In one embodiment, the Harmonizer 102 transmits a request to return the first set of service level data, i.e. the summarized set of data for the domain. In some examples the domain controller 103 returns the first set of service level data in a response to the request transmitted by the Harmonizer 102. In another example the domain controller 103 returns the first set of network domain metrics as a separate report. In some examples, the domain controller 103 comprises a timer to report the service level data at predefined intervals, e.g. upon expiry of the timer.

Aspects of the disclosure comprise a monitoring solution based on decoupling the infrastructure layer from the service layer in a hierarchical way. Each domain monitors service level parameters with local methods and local monitoring subsystems. These local methods and monitoring subsystems can be different for different domains due different resource types and different network entities. In some aspects, the summarized set of data is decoupled from the infrastructure under the control of the domain such that the summarized set of data is domain resource agnostic. In some examples, a format of the first set of service level data is independent of a technology of the network domain. For example, a common format is used for the first and/or second set of service level data for a plurality of network domains. In some examples, the format is common to all domains for which the Harmonizer 102 determines the E2E service level. The plurality of network domains may utilize same or different technologies, e.g. a packet switched domain or an optical domain. The common format provides for a direct combination of data from different domains, without additional translation steps within the Harmonizer. In some examples, the first set and//or second set of service level data from each domain is for common parameters, i.e. each domain reports using common or the same parameters.

Each domain performs service level parameter monitoring via a local monitoring system without the need to change domain specific service level parameters or implement a common monitoring systems for all domains.

In some examples, the domain controller 103 translates the information into common parameters to make the summarized set of data (or information) homogeneous for a network management entity, i.e. the Harmoniser. In some examples, this translation or abstraction provides the service level data in a domain resource agnostic format which simplifies the E2E service level estimation process by the higher layer management entity. In particular, the Harmonizer 102 is able to combine sets of data from different domains which are received with common (i.e. the same) parameters or metrics, e.g. calculated in the same way. The common parameters or metrics may be considered as examples of a common format.

In some examples, a translator 105 is configured to translate the service levels between the domain control entity and network management entity. The translator 105 may be considered as a part of one of the domain control entity or network management entity or as a separate entity. The translator 105 is configured to implement an algorithm to translate the E2E service level criteria from the Harmonizer 102 into per-domain service level criteria. In some examples these translations are between North Bound (NB) and South Bound (SB) layers in an SDN environment. These translations may be negotiated and agreed with each domain 104. This provides for the Harmonizer 102 to operate with standard or common service level criteria across all domains. The translator 105 converts between the standard service level criteria (or metrics) and the service level criteria (or metrics) particular to each domain.

The interfaces between the Harmonizer and the various domains may be implemented by a plug-in as opposed to being integrated within the domain architecture. The plug-in may be software controlled by higher layers such as the service layer. This reduces the effort for a network domain owner to become part of an E2E network slice. The decoupling of the infrastructure layer from the service layer for service level monitoring provides for operation on the infrastructure layer without knowing the implementation details of the infrastructure. As such, the operation of the Harmonizer is analogous to that of an SDN controller.

The embodiments are described in relation to the network architecture described by the IETF ACTN architecture. The concepts and the embodiments disclosed herein may apply to any variety of data and telecommunications networks, for example Public Land Mobile Network (PLMN), public and private IP networks.

The communications network 100 may employ or use network slicing. A slice is a logical portion of a multi-service network providing a certain function or set of functions. A slice can have specific service level criteria (to meet a specific SLA). In some aspects, network slicing is an operation of virtual networks on top of physical infrastructures, with virtual resource isolation and/or virtual network performance guaranties. Examples of such a network slice may be for providing massive IoT, another may be for providing mobile broadband. The network domains 104 provide the services for different network slices. Each network slice provides the service for a plurality of data flows. The E2E service level monitor 107 is configured to monitor E2E service level per network slice. In some aspects, the E2E service level monitor 107 is configured to monitor E2E service level of a plurality of data flows. Any references to monitoring of E2E service level may apply to an E2E service or to a E2E service for a network slice.

In the exemplary network described, a plurality of domains is defined for the various transport technologies provided by the network. The network may comprise a plurality of network slices. Each network slice may utilize one or more domains to fulfil its functional requirements. Each domain may support one or more network slices.

The first set of service level data from one domain may represent the network performance pertaining to that domain. In some examples, the first set of service level data may be an aggregate of the service level data for multiple slices or services. In a further aspect of the above described embodiment, the first set of service level data from one domain may represent the network performance pertaining to a single network slice utilising that domain and summarized, e.g. an aggregate of the service level data for multiple service flows (e.g. sessions) within the network slice.

Further embodiments provide for adapting the service level parameters based on the monitored E2E service level, as determined by the E2E service level monitor 107 or network management entity 101 or Harmonizer 102. For example, values of the service level parameters may be adapted in the event of a domain underperforming, in order to mitigate the effects on the E2E service level.

In some aspects, the Harmonizer 102 is configured to evaluate the E2E service level. The Harmonizer 102 is configured to determine if a service level has, or is predicted to, violate a threshold, e.g. the agreed service levels (e.g. according to SLAs). In a further aspect of the aforementioned operation, the first set of network domain service level data may not be sufficiently clear to result in a coherent E2E service level estimation. This may occur due to the abstraction of service level data from the resource specific service level data monitored by the domain, for example the received service level data being resource agnostic.

In some examples, the Harmonizer 102 is configured to carry out an additional investigation. For example, the Harmonizer 102 may obtain a detailed set of network domain service level data (referred to as a second set of data), in order to carry out the additional investigation. For example, the Harmonizer 102 is configured to transmit a request to a domain controller 103 to obtain the second set of network domain service level data. The domain controller 103 sends, or makes available, the second set of service level data in response to the request. The second set of service level data has additional (more) information than the first set, e.g. in at least one aspect the data is not summarized or is less summarized.

In some aspects, local service level degradations may not produce an overall E2E service level degradation below the agreed service levels (e.g. according to SLAs). However, further degradation in other parts of the network/other domains may ultimately cause the overall E2E service level to fall below the agreed levels. The Harmonizer 102 is configured to proactively avoid the cumulative degradation from occurring by reacting to the service level data, e.g. summarized service level data, from each domain. In some aspects, the Harmonizer may determine a particular domain is not meeting a required service level. In this case, the Harmonizer 102 is configured to request one or more further domains (e.g. having better-than-required QoS measurements) to adapt their current constraints and thereby maintain or increase current service levels. For example, for the one or more further domains, current service level performance criteria are increased or maintained. Domains for which the first set of data and/or second set of data is better than one or more performance criteria may be considered as over-performing network domains. This adaptation of required service levels for over-performing network domains is arranged to compensate for the degraded (i.e. reduced or under-performing) service level in another domain. Thus, the Harmonizer 102 is configured to modify service level constraints in a domain (e.g. which is meeting those constraints), in order to ensure the service level constraints of the E2E path (including a domain which is not meeting those constraints) are met.

In some embodiments, a domain controller 103 is configured to generate an alarm (e.g. an alarm signal or message), and the E2E service level monitor 102 is configured to receive the alarm from the domain controller 103. The E2E service level monitor 102 is configured to collect any alarms. The E2E service level monitor 102 is configured to verify whether the end-to-end service level of the network or network slice is degraded or not degraded.

The Harmonizer may obtain the second set of network domain service level data. For example, the Harmonizer may transmit a request to a domain controller 103 which initiates transmission of the second set of network domain service level data to the Harmonizer. The second set of network domain service level data may be transmitted for a domain in which an alarm is generated. The Harmonizer can thereby perform a more detailed analysis of the resources from which the alarms have been triggered, using the second set of network domain service level data. Thus, the detailed information of the second set of network domain service level data is only transmitted to the Harmonizer when useful, e.g. for identifying a fault. The second set of network domain service level data is not continually transmitted to determine the E2E service level. The second set of network domain service level data may be requested or transmitted even if the E2E service level monitor 102 determines that the E2E service level is not violated (for example because of a compensation between the individual domain metrics).

The analysis and/or the export of this more detailed second set of network domain service level data enables the E2E service level monitor 102 to determine the cause of the local service level violation. In some aspects, this allows the Harmonizer to take countermeasures before the end-to-end service level for the entire network slice is degraded, e.g. violating the requirements of the SLA.

Each domain performs service level monitoring using a preferred or specific method for each domain. Thus, the method and network management entity may provide an E2E monitoring, even if each domain carries out monitoring using a method which is independent or different to another domain. In order to perform this monitoring, each local service level monitor 106 is determining values according to certain service level constraints for the domain. A constraint may be a performance metric, metric value or range of values against which the service level is monitored. Collected data is accessible in each domain and the domain controller 103 is configured to compute a globally understandable, summarized version of collected data (i.e. first set of data).

In a heterogeneous network with network slicing, the Harmonizer 102 may define which resources have to be provided by each domain to satisfy the end-to-end service requirements.

Similarly, the service level requirements for the network slice may be defined end-to-end for the entire slice. In some examples the Harmonizer 102 defines the set of service level constraints for the resources pertaining to a network slice. The Harmonizer may translate the E2E constraints into constraints for each domain and transmit these constraints to the domain controllers.

Figure 3:
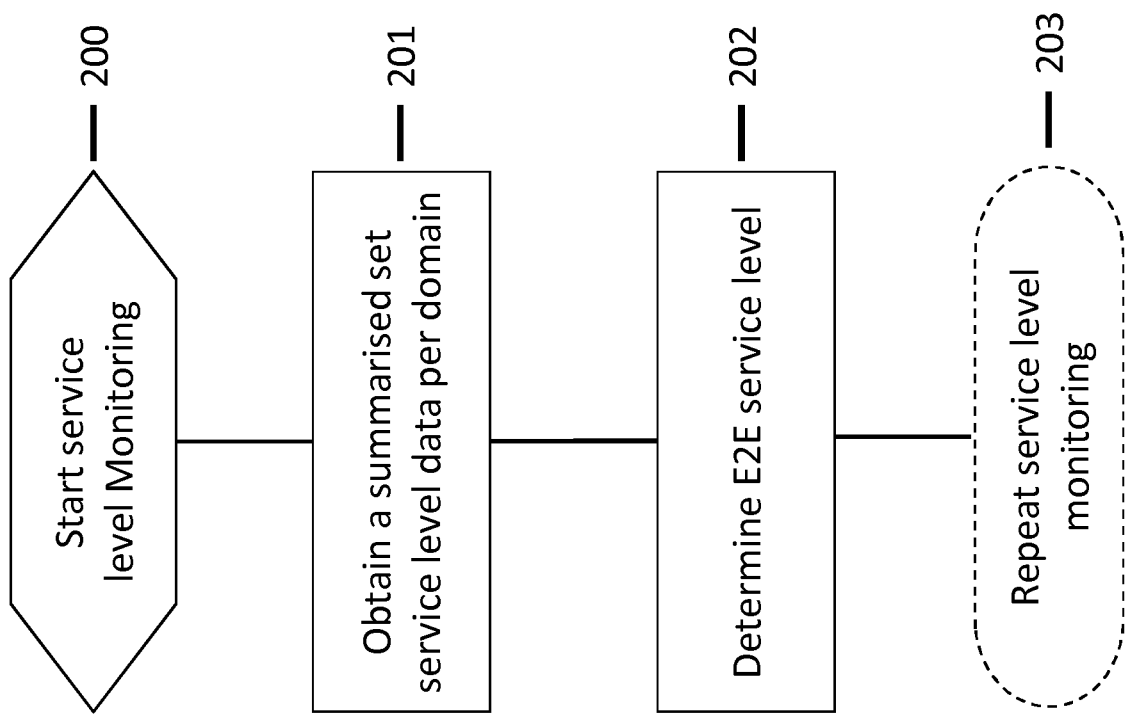
FIG. 3 shows a method according to an embodiment of the disclosure.

The processes are now described in more detail with reference to the accompanying figures. FIG. 3 demonstrates the sequence of the aforementioned actions in the E2E service level monitor 107. The process begins at 200 and the E2E service level monitor obtains 201 a first set of network domain service level data on a per domain basis. The data is summarized or compressed. Thus, the data transmitted to the E2E service level monitor 107 is not the full set of data as collected in the domain, but only a subset, aggregated, or summarized to some extent. Once the Harmonizer 102 collects the first set of service level monitoring data from each of the domains, the Harmonizer uses the data to compute or determine 202 the end-to-end service level for the network or network slice being monitored. In one embodiment the E2E service level monitor determines that no violations have occurred, at which point the process repeats or continues 203, e.g. at predefined intervals.

Figure 4:
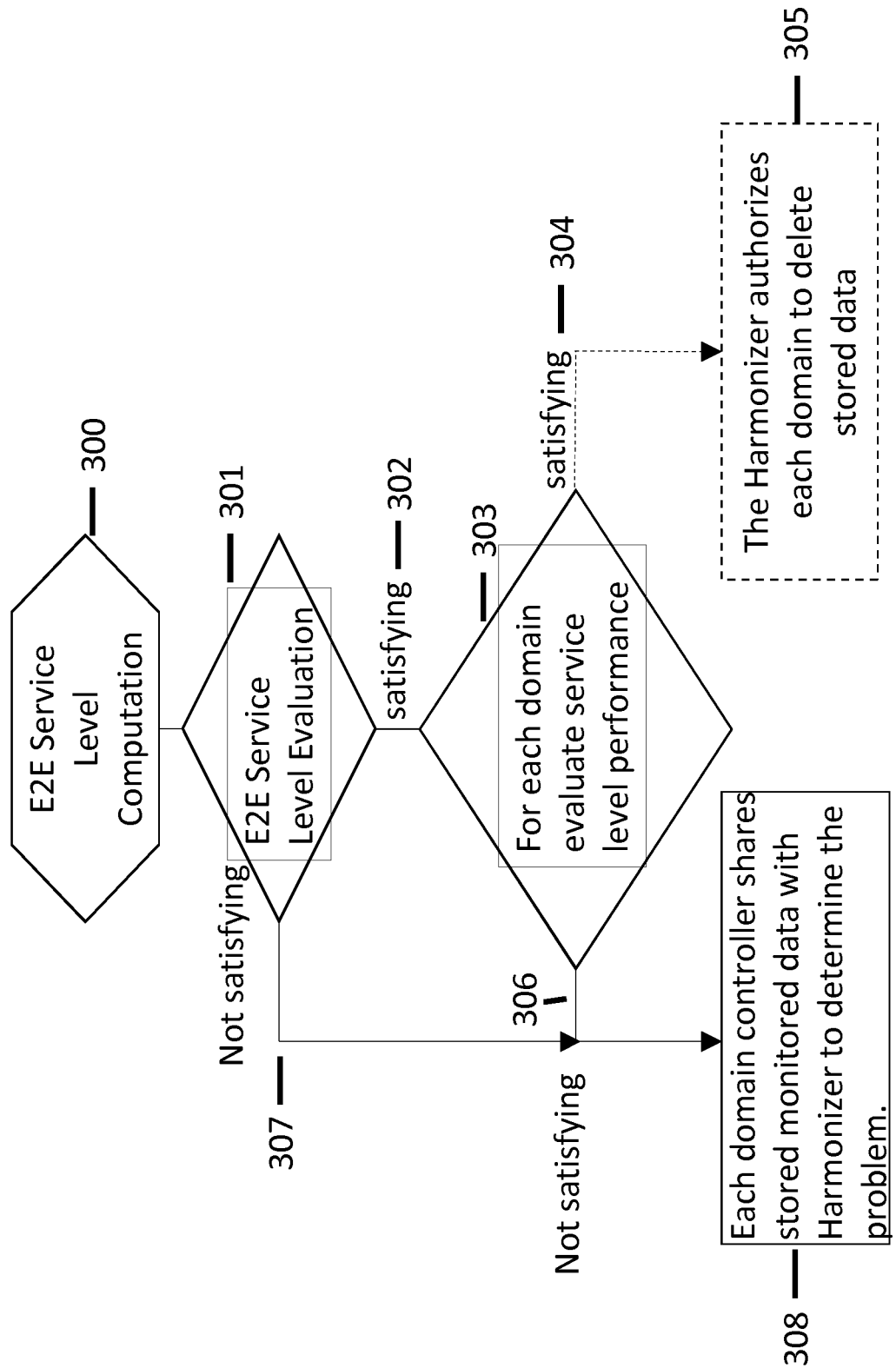
FIG. 4 shows a method according to a further embodiment of the disclosure.

In another aspect, as shown in FIG. 4, the E2E service level as computed 300 (as described above) in the E2E service level monitor 107 is further evaluated 301 in the E2E service level monitor 107 or Harmonizer 102. The E2E service level is evaluated 301 against the E2E service level criteria and requirements which reflect the service level agreements for the network or network slice. If the E2E service level is determined by the Harmonizer 102 to be satisfying 302 those criteria, the service level for each separate domain is evaluated 303. In some examples, the service level for each separate domain is evaluated based on the received first set of data.

If the evaluation of each domain of the E2E path determines all of the domains satisfying 304 their criteria, the network or network slice is considered to be fully satisfying the E2E service level criteria. In some examples, the network domain service level data (e.g. second set of data) is not required, and may be discarded 305. In some examples, the Harmonizer 102 authorises the domain controller 103 to discard 305 the stored data.

If the service level for one or more domains does not satisfy 306 their service level criteria the network or network slice is deemed as partially satisfying its E2E service level criteria. This situation typically arises when one or more domains have provided network domain service level data which outperform the domain level constraints. However, the situation can also arise if the service level metrics are not usable or understandable, for example, if the data was corrupted or out of range of the protocol parameter values for the summarized service level data. The corresponding one or more domain controller 103 is arranged to provide 308 a second set of network domain service level data which is more detailed data compared to the first set of service level data used to determine the initial E2E service level. For example, the one or more domain controller 103 is requested by the Harmonizer 102 to provide the second set of data.

In the case 307 that one or more domain does not satisfy their requirements or if the E2E service level, the corresponding one or more domain controller 103 is arranged to provide 308 a second set of network domain service level data which is more detailed data compared to the first set of service level data used to determine the initial E2E service level. For example, the one or more domain controller 103 is requested by the Harmonizer 102 to provide the second set of data.

The second set of service level data may contain all of the service level data monitored by the domain controller or a subset thereof.

The second set of service level metrics is shared 308 with the Harmonizer when the Harmonizer 102 determines that either the domain service level or E2E service level is below the required level, i.e. performance is worse than a threshold value.

The detailed data can be provided to the Harmonizer directly through a signalling interface. The detailed data may be stored in a repository from which the Harmonizer can obtain the data, either directly or by the domain controller providing a reference to the stored data. The Harmonizer is configured to perform more detailed analysis using the second sect of data to ascertain more precisely where the problem lies and/or implement mitigation techniques as further described herein.

Service level criteria can cover any parameter which has been agreed for a given network or network slice (e.g.

bandwidth, latency, availability). Examples describing the domain service level monitoring process are depicted in FIG. 5.

Figure 5:
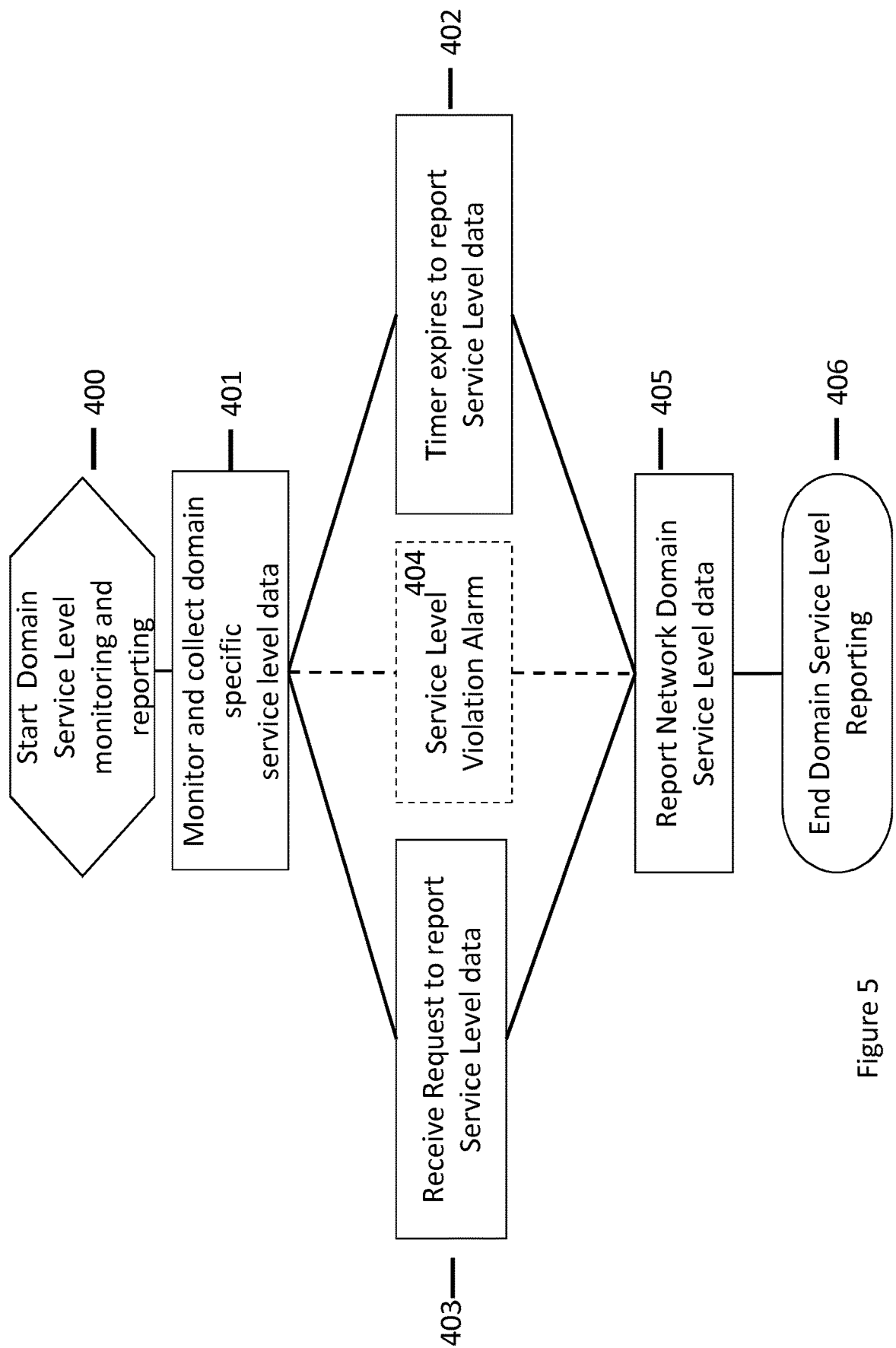
FIG. 5 shows a method according to a further embodiment of the disclosure.

In FIG. 5, in the respective domains, service level monitoring 400 is performed by means specific to the technology for that domain. For example, a packet based network may utilise industry standard tools for collecting and analysing service level data.

Each domain controller produces a compressed or summarised set of service level data based on or derived from the domain level service level data collected 401 by the local service level monitor entity. In some examples the service level data are specific to a network slice. In further examples the service level data are an aggregate of the service level for all service flows or sessions for that network slice.

The domain controller may be preconfigured, either dynamically at system integration or statically via predefined network parameters, to report a first set of network domain service level data at a set time interval 402. The domain controller may operate a timer to determine the set time intervals, which upon expiry would trigger reporting 405 of the network domain service level data.

In an alternative example, the domain controller receives 403 a request to report the first set of network domain service level data and as a result reports 405 the first set of service level data, e.g. to the Harmonizer 102. The signalling of the first set of service level data in this case can either be as a response to the request or as a separate report.

The first set of network domain service level data which is exported to the Harmonizer is a compressed set or summary of the service level data monitored by the domain. The first set of service level data may be an aggregate of all flows within the domain. The format of the service level data may be in a standardised form.

The local service level monitor function monitors performance in this domain and can trigger an alarm 404 if the domain latency exceeds the local service level. In one embodiment the measurements and analysis within the respective domains which result in any criteria not being met (for example traffic in an optical domain for that slice was rerouted to a longer path such that the delay violates the local service level requirement), the local service level monitor informs the E2E service level monitor of the specific service level violation for that domain.

The process ends or continues again at step 406.

Figure 6:
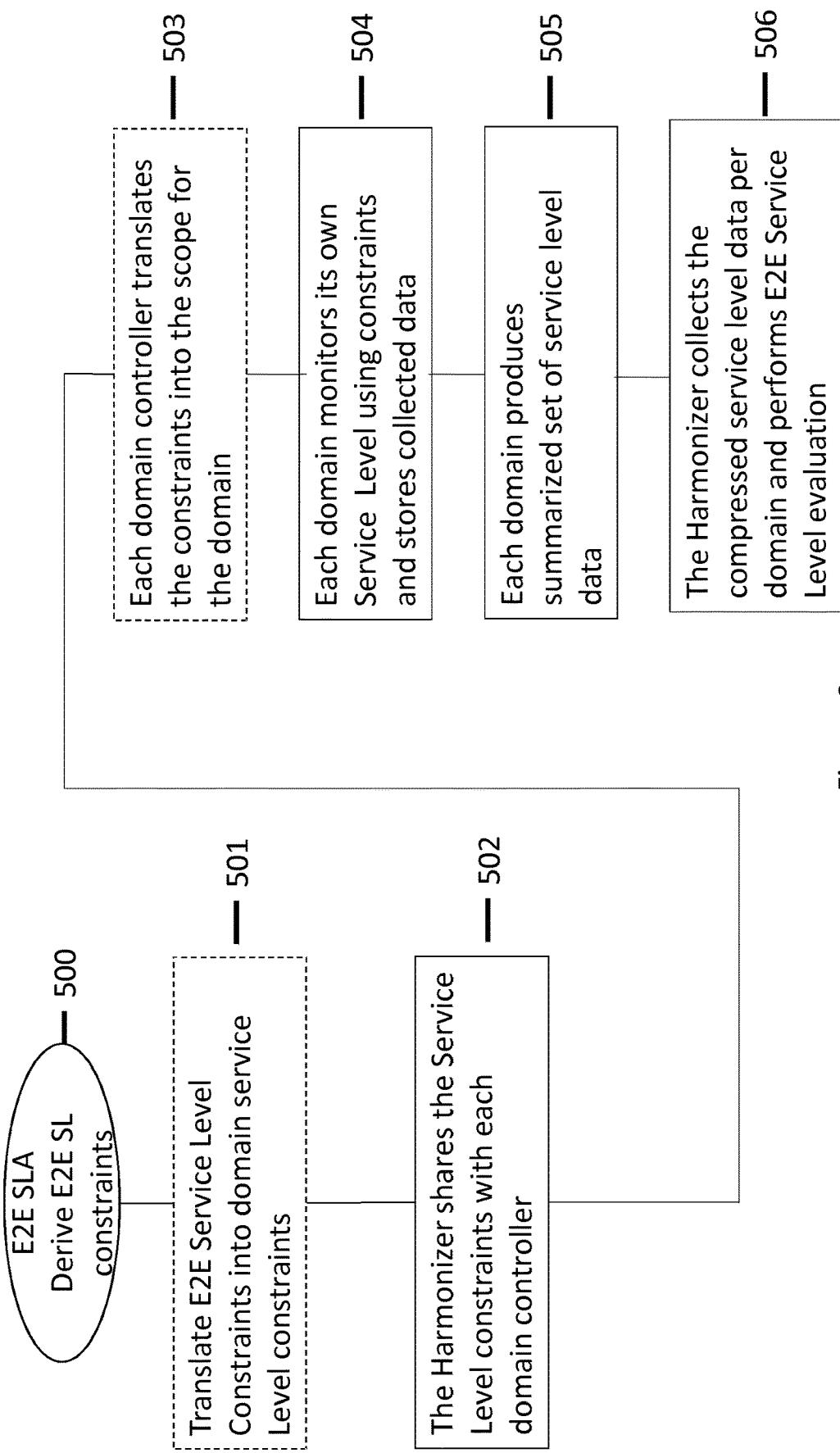
FIG. 6 shows a method according to a further embodiment of the disclosure.

In FIG. 6, a handling of the service level constraints is depicted. The E2E performance of the network or network slice is governed by an E2E Service Level Agreement 500 from which the Harmonizer derives E2E service level constraints.

The Harmonizer 102 may translate 501 these constraints into domain level service level constraints for each domain. These constraints can be specific to each domain. The constraints may be in a unified, standardised form. The Harmonizer 102 shares 502 the service level constraints with each network domain controller 103. In other examples the Harmonizer 102 shares the E2E service level constraints with the plurality of domain controllers wherein each domain controller derives its own set of constraints applicable to the resources under its control. In some instances, the constraints may not be in a form readily usable by the domain itself. Optionally, the domain controllers may translate 503 such constraints into a format or scope applicable (particular) for their domain. In another operation, the domain controllers 103 monitor their own service level according to those constraints.

The domain controllers 103 store 504 the collected service level data. The domain controllers produce 505 a compressed set or summarised set of service level data, based on, or derived from, the service level metrics monitored for the domain. This first set of service level data should be formatted into a standardised form. The first set of service level data may be an aggregate of service level data for multiple service flows or all service flows in the domain. In some examples, each domain supports a plurality of traffic flows. The service level data may apply to a single network slice supported by the domain.

The service level data (e.g. first set of data) is collected 506 by the Harmonizer 102 through methods as described in earlier embodiments.

Figure 7:
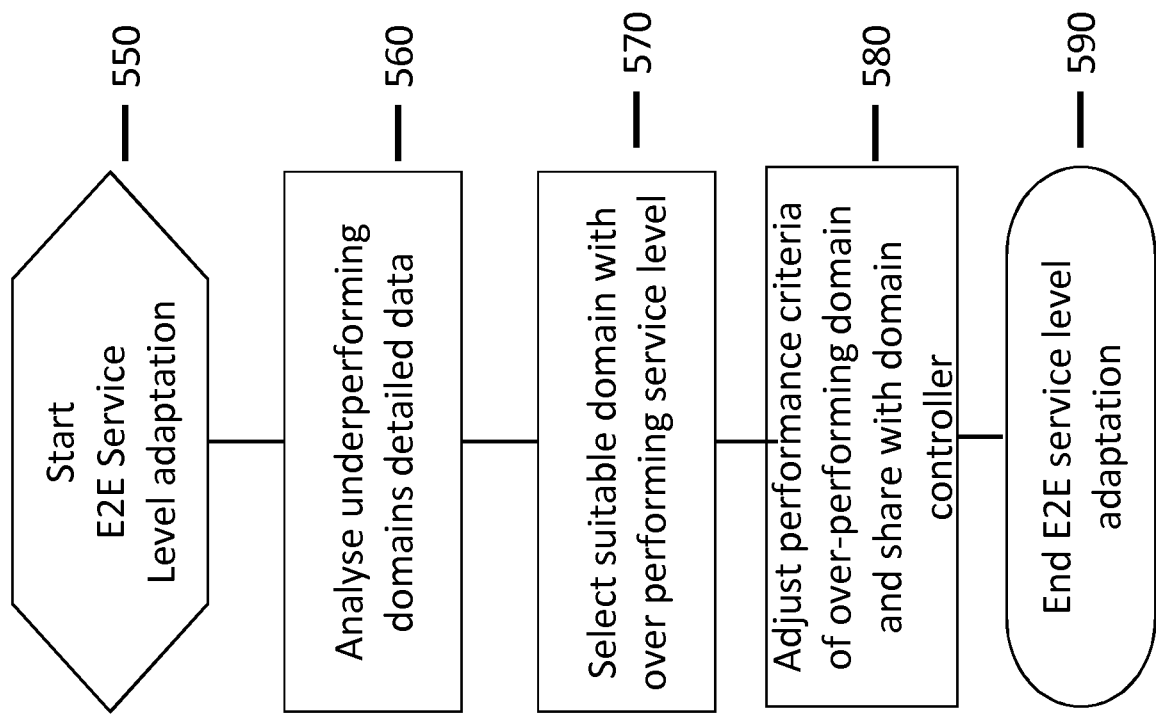
FIG. 7 shows a method according to a further embodiment of the disclosure.

In FIG. 7, a process for adapting the domain level constraints is described starting at 550. In this example, the Harmonizer 102 has determined that the E2E service level criteria have not been met or only partially met (e.g. according to FIG. 4, processes 306,307). The E2E Service Level monitor 107 obtains a second set of service level metrics which comprises more detailed data compared to the first set of service level metrics. The second set of service level metrics can be obtained from one or more domains as described through the one or more embodiments disclosed.

The Harmonizer 102 determines that a domain is not satisfying one or more performance criteria for the one or more network domain, e.g. by analyzing 560 the detailed domain level data (second set of service level data) to determine which specific service level metrics are affecting the network domain service level and thereby resulting in the underperformance of the domain. An example of a service level metric is a QoS attribute, such as packet transmission delay. An example where degradation can occur may be as a result of a link failure and an alternative (longer) link being utilised.

If another domain is currently performing better than expected with corresponding QoS attributes, this domain can be selected 570 by the Harmonizer as a candidate for compensating the underperforming domain. The Harmonizer adjusts 580 the domain level constraints of the over-performing domain to enforce the over performing domain to continue exceeding its previous performance criteria. The under-performing domain may remain degraded until it is able to resolve the issue causing the degradation. The new adapted constraints are shared with the relevant domain controller to apply to subsequent monitoring. The service level adaptation process is terminated at 590. This provides the advantage of allowing one domain which is outperforming its own service level criteria to compensate the E2E service level for an underperforming domain. The compensation by a domain is ensured by modifying one or more performance criteria of the over-performing domain (not by modifying the criteria for the domain which is underperforming).

In an embodiment, the methods described are performed by the Harmonizer as a functional entity within an MDSC of a multi-layer control network. The network is defined according to the ACTN framework and the methods performed by the domain controllers are performed by a PNC according to the ACTN framework.

Figure 8:
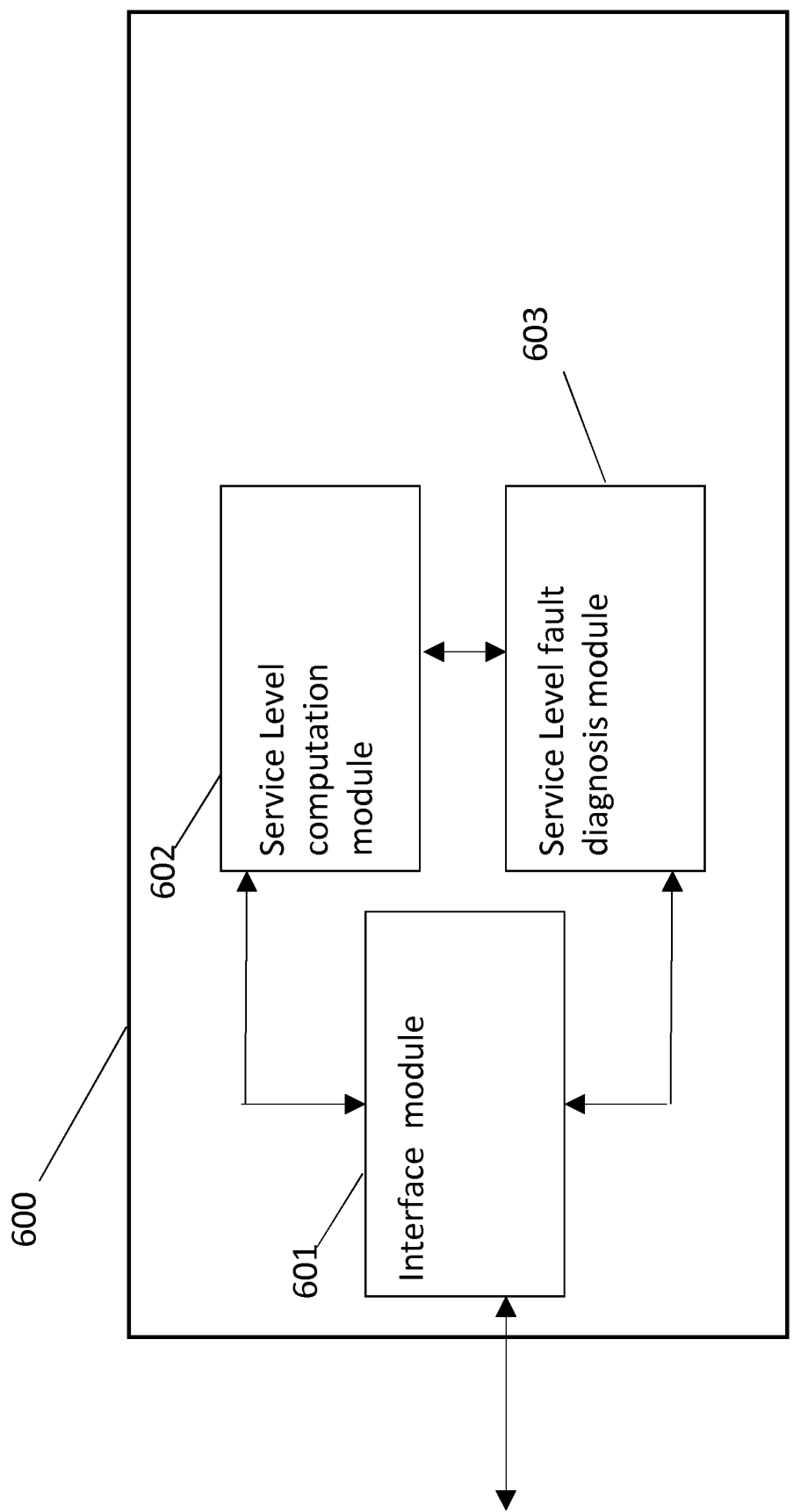
FIG. 8 shows an example of an apparatus according to an example of the disclosure.

FIG. 8 shows an example network control entity (also referred to as a network controller 101 or apparatus) 600 corresponding to the network controller 101, or a part thereof, e.g. the Harmonizer 102 or E2E service level monitor 107, e.g. an entity within an MDSC. The network control entity comprises an interface module 601 for communication with the plurality of domains.

The network controller 600 comprises a service level computation module 602 configured to compile the first sets of service level metrics received from the plurality of domains. The service level computation module 602 is configured to compute an E2E service level. A service level fault diagnosis module 603 is configured to receive a second set of service level metrics, i.e. more detailed data, from one or more domains. The computation module 602 and the fault diagnosis module 603 communicate via the interface module 601. The service level fault diagnosis module 603 is configured to analyse the second sets of metrics to establish specific causes of a domain level service degradation. The service level fault diagnosis module 603 may be further configured to adapt one or more domain service level constraints to compensate for under-performing domains, e.g. according to any example.

Aspects of the disclosure provide an apparatus (600) for determining E2E service level in a communications network. The apparatus comprises a service level computation module (602) configured to obtain, via an interface module (601), a first set of service level data of the one or more network domain. The first set of service level data of said one or more network domain comprises a summarized set of data derived from service level data monitored by said one or more network domain. The service level computation module (602) is further configured to determine an end-to-end, E2E, service level based on the obtained first set of service level data from the one or more network domain. In some examples, the apparatus 600 is a network management entity or MDSC.

In some aspects, a service level fault diagnosis module (603) is configured to compare the determined E2E service level with an E2E service level performance criteria and compare the one or more first set of service level data with performance criteria for the one or more network domain. The service level fault diagnosis module (603) is configured to obtain, via the interface module (601), a second set of service level data of the one or more network domain when the determined E2E service level is not satisfying the E2E performance criteria or when the one or more first set of service level data is not satisfying the performance criteria for the one or more network domain. The second set of service level data comprises additional information to the first set of service level data.

In some aspects, the service level fault diagnosis module (603) is configured to: determine that one or more network domain is not satisfying (307) one or more performance criteria for the one or more network domain. The service level fault diagnosis module (603) is further configured to select (570) a second network domain for which the first or second set of service level data are over-performing with respect to the one or more performance criteria for the second network domain. The service level fault diagnosis module (603) is further configured to request (580) said second network domain to maintain or increase one or more performance criteria for said second network domain to compensate for said first network domain.

In some aspects, the service level computation module (602) or service level fault diagnosis module (603) is configured to obtaining the first set of service level data or second set of service level data respectively by requesting the first set of service level data or second set of service level data.

In some aspects, the service level fault diagnosis module (603) is configured to translate (501) one or more E2E network service level constraints into network domain service level constraints for the one or more network domain. The service level fault diagnosis module is further configured to signal (502) said network domain service level constraints for the one or more network domain.

Figure 9:
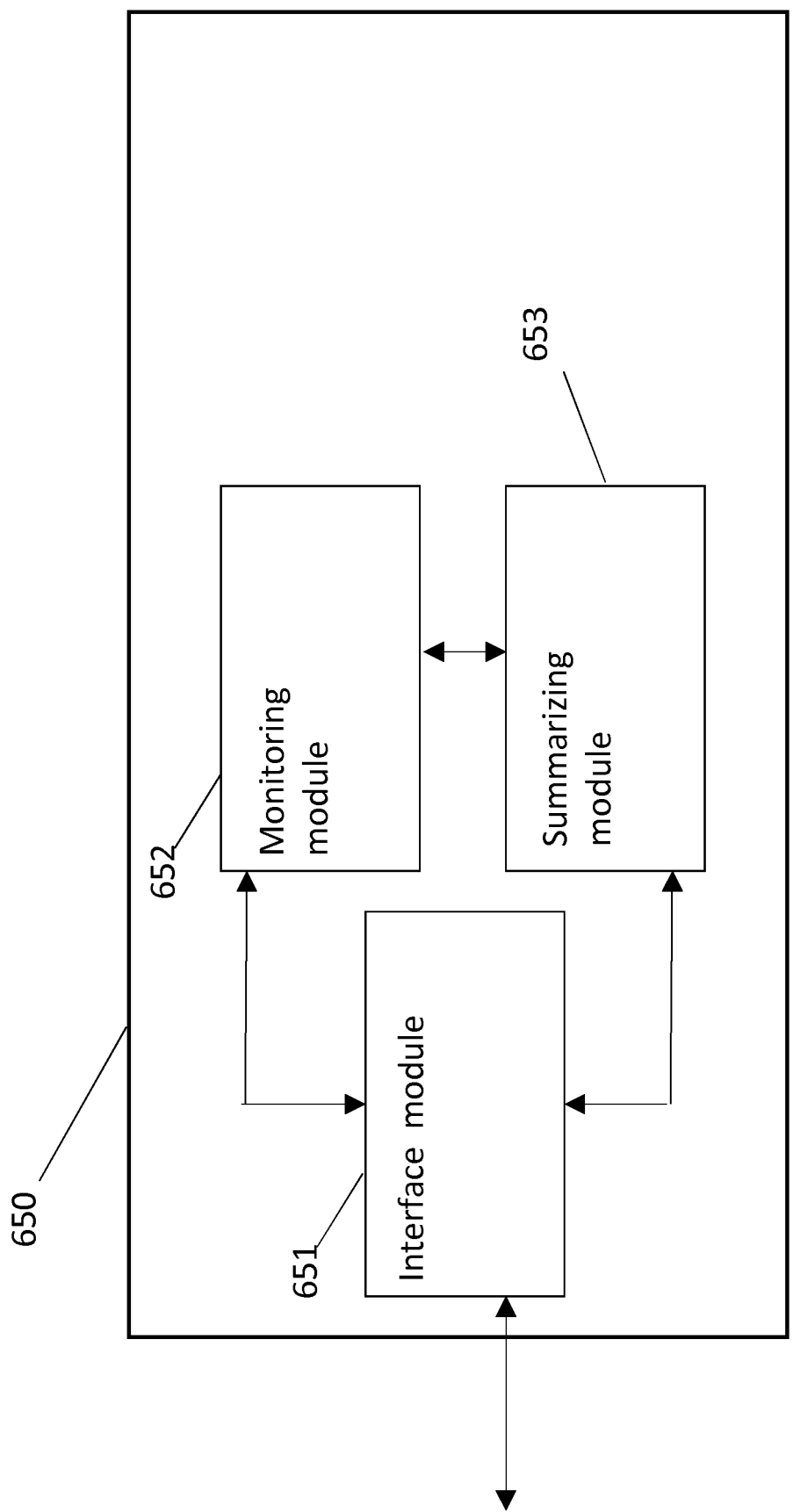
FIG. 9 shows a further example of an apparatus according to an example of the disclosure.

FIG. 9 shows an example domain controller or apparatus 650 corresponding to the domain controller 103 or PNC, or a part thereof, e.g. the local service level monitor 106, e.g. an entity within an PNC. The network control entity comprises an interface module 651 for communication with the local domain and the network management entity 101 or Harmonizer 102.

The domain controller 650 comprises monitoring module 652 configured to monitor the local domain, e.g. resources within the domain. The monitoring module 652 is configured to collect and store data according to the performance criteria or metrics. compute an E2E service level. The detailed stored data corresponds to the second set of data which may be transmitted if needed to the network management entity 101.

The domain controller 650 further comprises a summarizing module 653 configured to receive the collected service level metrics from the monitoring module 652, i.e. detailed data, from one or more domains. The summarizing module 653 is configured to generate the first of service level data, i.e. the summarized set of data derived from service level data monitored by the network domain controller 650. The summarizing module 653 is optionally configured to translate the monitored data into a common format, such that the summarized set of data transmitted to the network management entity 101 is in a common format for all the domains of the E2E service.

Aspects of the disclosure provide an apparatus (650) configured to monitor a local service level in a domain control entity configured to control a network domain in a communications network. The apparatus (650) comprises a monitoring module (652) configured to monitor (401) a service level data for the network domain, and a summarizing module (653) configured to summarize (402) the monitored data into a first set of service level data. The apparatus is configured to report (405), via an interface module (651), the first set of service level data to a network management entity for determining an E2E service level for the communications network. In some examples, the apparatus is a domain controller or PNC.

In some aspects, the monitoring module (652) is configured to receive (403) a request for additional information to the first set of service level data, and configured to report (405) a second set of service level data comprising additional information to the first set of service level data.

In some aspects, the summarizing module (653) is configured to translate the monitored data into a common format.

In some aspects, the monitoring module (652) is configured to determine a violation of a service level performance criteria (404);
reporting (405) service level data pertaining to the violated service level performance criteria.

In some aspects, the monitoring module (652) is configured to receive (502) service level constraints for determining service level performance and monitor (504) the service level for the domain according to the service level constraints.

In some aspects, the service level constraints comprise constraints for the E2E service level, and the monitoring module (652) is configured to translate (503) the received E2E service level constraints into constraints applicable to the domain; and monitor (504) the service level for the domain according to the translated service level constraints applicable to the domain.

The modules described may be implemented in software, firmware or hardware. A description of a separate module does not indicate a separate implementation, one or more modules may be implemented by the same software, firmware or hardware.

In an embodiment, the domain and/or network controller 101, 103, 600 is an SDN controller, e.g. a PNC and/or MDSC.

Figure 10:
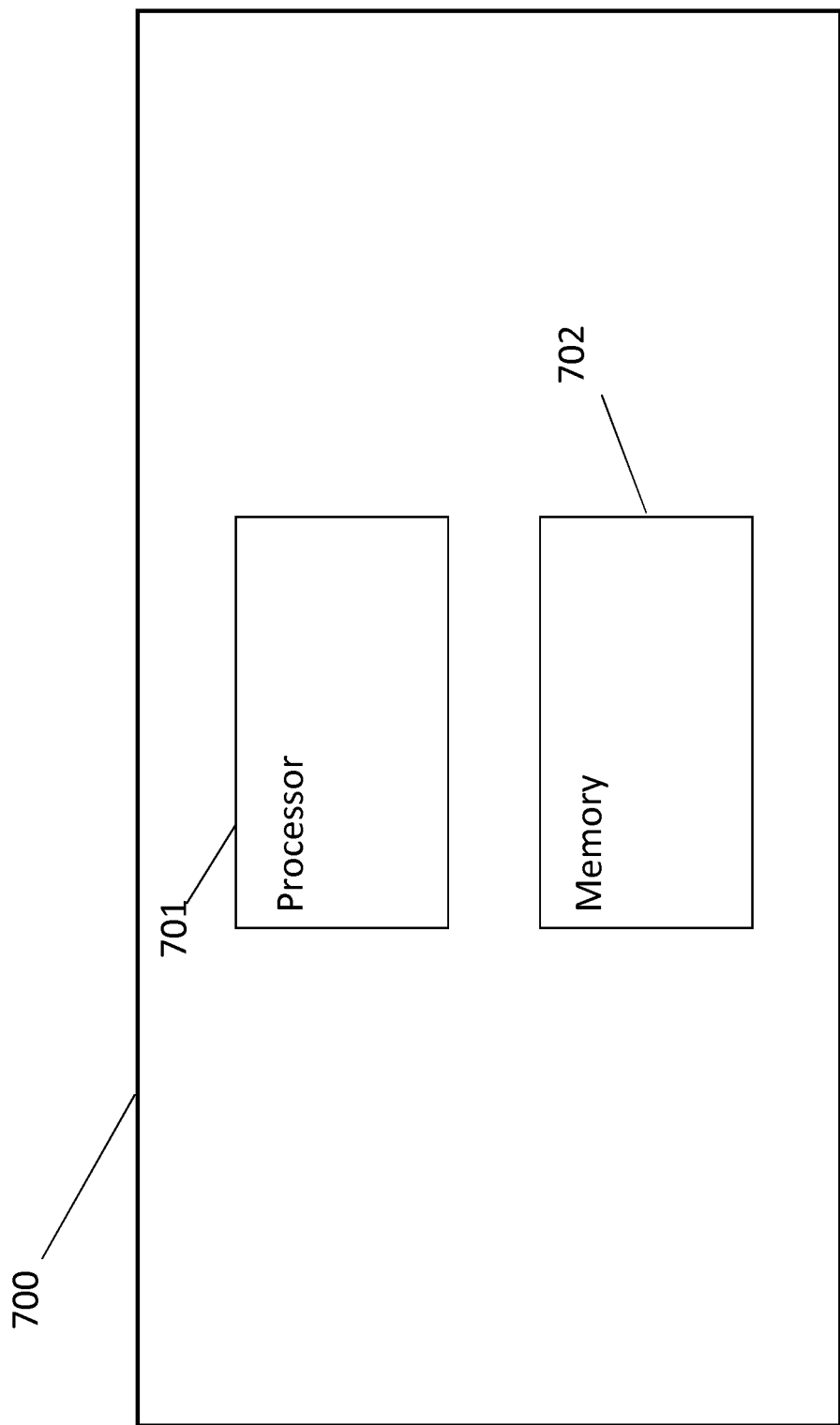
FIG. 10 shows a further example of an apparatus according to a further example of the disclosure.

Referring to FIG. 10, shows an example network control entity 700 corresponding to the network controller 101, or part thereof e.g. Harmonizer, or domain control entity. The network control entity 700 comprises a processor 701 and a memory 702. The memory contains instructions executable by the processor. The control entity 700 is operative to implement the method described in any example.

In some aspects, the memory 702 contains instructions executable by the processor, whereby the control entity (e.g. MDSC or PNC) is operative to implement any example of the disclosure.

In an embodiment, the interface module 601, service level computation module 602 and service level fault diagnosis module 603 described above, or any example described, are implemented as a computer program running on the processor 701.

Each control entity (e.g. the Harmonizer and/or domain controller) may be implemented using one or more processors, hardware, processing hardware or circuitry. References to processors, hardware, processing hardware or circuitry can encompass any kind of logic or analogue circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example. The memory of any example may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Alternatively, the memory used may be a transitory memory, e.g. RAM.

A further embodiment of the disclosure provides a computer program, comprising instructions which, when executed on at least one processor, cause the at least one processor to carry out any of the steps of the above described methods for E2E service level monitoring and/or adaptation.

A further embodiment of the disclosure provides a carrier containing a computer program, comprising instructions which, when executed on at least one processor, cause the at least one processor to carry out any of the steps of any of the above methods of monitoring or adapting the E2E service level of a communication network. The carrier is one of an electronic signal, optical signal, radio signal, or computer readable storage medium.

| Abbreviation | Explanation |
| --- | --- |
| ACTN | Abstraction and Control of Transport Networks |
| E2E | End-to-end |
| MDSC | Multi-Domain Service Coordinator |
| PNC | Physical Network Controller |
| QoS | Quality of Service |
| SDN | Software Defined Networking |
| SLA | Service Level Agreement |
| WDM | Wavelength Division Multiplexing |

The invention claimed is:

1. A method of determining an end-to-end (E2E) service level for a heterogeneous transport network by a network management entity, the heterogeneous transport network comprising a plurality of network domains, each network domain comprising physical communications network entities under the control of a respective physical network controller and the E2E service level corresponding to an aggregated service level of each one of the plurality of network domains involved in an E2E path carrying data, the method comprising:
obtaining a first set of service level data for each one of the plurality of network domains, the first set of service level data for each of the plurality of network domains comprising a summarized set of data derived from service level data monitored by the corresponding network domain of the plurality of network domains;
determining the end-to-end service level based on the obtained first set of service level data for each of the plurality of network domains;
translating the summarized set of data for each one of the plurality of network domains into a format independent of a technology of the respective network domain and in a common format for a plurality of the network domains;
based on the translated summarized set of data for each of the plurality of network domains:
determining that a first network domain is not satisfying one or more performance criteria for the first network domain;
selecting a second network domain for which the first set of service level data are over-performing with respect to the one or more performance criteria for the second network domain; and
requesting the second network domain to maintain or increase one or more performance criteria for the second network domain to compensate for the first network domain.

2. The method as claimed in claim 1, wherein the communications network is divided into a plurality of network slices, wherein a network slice provides network capabilities for an end-to-end service and the service level data for the plurality of network domains comprises service level data for one or more network domains associated with one of the plurality of network slices.

3. The method as claimed in claim 1, wherein the obtaining the first set of service level data or a second set of service level data comprises:
requesting the first set of service level data or second set of service level data and receiving, in response, the requested set of service level data for the one or more network domain.

4. The method as claimed in claim 1, further comprising:
translating a E2E network service level constraint into a network domain service level constraint for the plurality of network domains; and signaling the network domain service level constraint for the one or more network domain.

5. A method of monitoring a local service level in a domain control entity to control a network domain in a heterogeneous transport network, the network domain comprising physical communications network entities under the control of the domain control entity, the method comprising:
monitoring service level data for the network domain;
summarizing the monitored data into a first set of service level data, the summarizing the monitored data into a first set of service level data comprising translating the monitored data into a common format and in a format independent of a technology of the network domain;
reporting the first set of service level data to a network management entity for determining an E2E service level for the heterogeneous transport network, the E2E service level corresponding to an aggregated service level of each one of the plurality of network domains involved in an E2E path carrying data;
determining that a first network domain is not satisfying one or more performance criteria for the first network domain;
selecting a second network domain for which the first set of service level data are over-performing with respect to the one or more performance criteria for the second network domain; and
requesting the second network domain to maintain or increase one or more performance criteria for the second network domain to compensate for the first network domain.

6. The method as claimed in claim 5 wherein the summarizing the monitored data into a first set of service level data comprises one or more of:
an average over time, an aggregate of a plurality of data flows, a subset of monitored data.

7. The method according to claim 5, further comprising:
receiving a request for additional information to the first set of service level data,
reporting a second set of service level data comprising additional information to the first set of service level data;
determining a violation of a service level performance criteria;
reporting service level data pertaining to the violated service level performance criteria;
receiving service level constraints for determining service level performance;
monitoring the service level for the domain according to the service level constraints, the service level constraints comprising constraints for the E2E service level;
translating the received E2E service level constraints into constraints applicable to the domain; and
monitoring the service level for the domain according to the translated service level constraints applicable to the domain.

8. A network management entity comprising a memory coupled to processing circuitry for determining an end-to-end (E2E) service level in a heterogeneous transport network comprising a plurality of network domains, each network domain comprising physical communications network entities under the control of a respective physical network controller and the E2E service level corresponding to an aggregated service level of each one of the plurality of network domains involved in an E2E path carrying data, the network management entity configured to:
obtain a first set of service level data for each of the plurality of network domains, the first set of service level data for each of the plurality of network domains comprising a summarized set of data derived from service level data monitored by the corresponding network domain of the plurality of network domains;
determine an E2E service level based on the obtained first set of service level data for each of the plurality of network domains;
translate the summarized set of data for each of the plurality of network domains into a format independent of a technology of the respective network domain and in a common format for a plurality of the network domains;
based on the translated summarized set of data for each of the plurality of network domains:
determine that a first network domain is not satisfying one or more performance criteria for the first network domain;
select a second network domain for which the first set of service level data are over-performing with respect to the one or more performance criteria for the second network domain; and
request the second network domain to maintain or increase one or more performance criteria for the second network domain to compensate for the first network domain.

9. The network management entity as claimed in claim 8, further configured to compare the determined E2E service level with an E2E service level performance criteria, wherein the network management entity is configured to obtain a second set of service level data for the one or more network domain when the determined E2E service level is not satisfying the E2E service level performance criteria; wherein the second set of service level data comprises additional information to the first set of service level data, further configured to:
compare the one or more first set of service level data with one or more performance criteria for the one or more network domain; wherein the network management entity is configured to obtain a second set of service level data for the one or more network domain when the one or more first set of service level data is not satisfying the performance criteria for the one or more network domain, wherein the second set of service level data comprises additional information to the first set of service level data, and further configured to;
determine that one or more network domain is not satisfying one or more performance criteria for the one or more network domain, wherein the network management entity is further configured to select a second network domain for which the first or second set of service level data are over-performing with respect to the one or more performance criteria for the second network domain; and wherein the network management entity is further configured to request the second network domain to maintain or increase one or more performance criteria for the second network domain to compensate for the first network domain.

10. A network domain control entity comprising a memory coupled to processing circuitry configured to monitor service level data in a network domain of a heterogenous transport network, the network domain comprising physical communications network entities under the control of the network domain control entity, the network domain control entity configured to:
monitor service level data for the network domain;

summarize the monitored data into a first set of service level data, the summarized monitored data comprising translated monitored data in a common format and in a format independent of a technology of the network domain;

report the first set of service level data to a network management entity for determining an E2E service level for the communications network, the E2E service level corresponding to an aggregated service level of each one of the plurality of network domains involved in an E2E path carrying data;

determine that a first network domain is not satisfying one or more performance criteria for the first network domain;

select a second network domain for which the first set of service level data are over-performing with respect to the one or more performance criteria for the second network domain; and request the second network domain to maintain or increase one or more performance criteria for the second network domain to compensate for the first network domain.

11. The network domain control entity according to claim 10, further configured to report a second set of service level data, wherein the second set of service level data comprises additional information to the first set of service level data.

12. A non-transitory computer storage medium storing a computer program for determining an end-to-end (E2E) service level for a heterogeneous transport network comprising a plurality of network domains, each network domain comprising physical communications network entities under the control of a respective physical network controller, the computer program comprising computer code which, when run on processing circuitry of a network management entity, causes the network management entity to:

obtain a first set of service level data for each one of the plurality of network domains, the first set of service level data for each of the plurality of network domains comprising a summarized set of data derived from service level data monitored by a corresponding network domain of the plurality of network domains;

determine the end-to-end service level based on the obtained first set of service level data for the plurality of network domains;

translate the summarized set of data for each one of the plurality of network domains into a format independent of a technology of the respective network domain and in a common format for a plurality of the network domains;

based on the translated summarized set of data for each of the plurality of network domains:

determine that a first network domain is not satisfying one or more performance criteria for the first network domain;

select a second network domain for which the first set of service level data are over-performing with respect to the one or more performance criteria for the second network domain; and request the second network domain to maintain or increase one or more performance criteria for the second network domain to compensate for the first network domain.

13. A non-transitory computer storage medium storing a computer program for monitoring a local service level, the computer program comprising computer code which, when run on processing circuitry of a domain control entity configured to control a network domain in a heterogeneous transport network, each network domain comprising physical communications network entities under the control of a respective domain control entity, causes the domain control entity to:

monitor service level data for the network domain;

summarize the monitored data into a first set of service level data, the summarized monitored data comprising translated monitored data in a common format and in a format independent of a technology of the network domain;

report the first set of service level data to a network management entity for determining an E2E service level for the communications network, the E2E service level corresponding to an aggregated service level of each one of the plurality of network domains involved in an E2E path carrying data;

determine that a first network domain is not satisfying one or more performance criteria for the first network domain;

select a second network domain for which the first set of service level data are over-performing with respect to the one or more performance criteria for the second network domain; and request the second network domain to maintain or increase one or more performance criteria for the second network domain to compensate for the first network domain.

\* \* \* \* \*